US011877970B2

(12) United States Patent
Falk et al.

(10) Patent No.: US 11,877,970 B2
(45) Date of Patent: Jan. 23, 2024

(54) CONFIGURABLE PATIENT SLING

(71) Applicant: Arjo IP Holding AB, Malmo (SE)

(72) Inventors: Thomas Falk, Staffanstorp (SE); Lotta Gram, Ystad (SE); Marie Rubin, Barseback (SE)

(73) Assignee: Arjo IP Holding AB, Malmo (SE)

( * ) Notice: Subject to any disclaimer, the term of this patent is extended or adjusted under 35 U.S.C. 154(b) by 36 days.

(21) Appl. No.: 17/529,612

(22) Filed: Nov. 18, 2021

(65) Prior Publication Data

US 2022/0151851 A1 May 19, 2022

Related U.S. Application Data

(63) Continuation of application No. 15/740,427, filed as application No. PCT/EP2016/065221 on Jun. 29, 2016, now abandoned.

(30) Foreign Application Priority Data

Jun. 30, 2015 (EP) .................................... 15174444

(51) Int. Cl.
*A61G 7/10* (2006.01)

(52) U.S. Cl.
CPC ......... *A61G 7/1051* (2013.01); *A61G 7/1053* (2013.01); *A61G 2200/34* (2013.01)

(58) Field of Classification Search
CPC . A61G 7/1051; A61G 7/1053; A61G 2200/34
USPC .......................................................... 5/81.1 T
See application file for complete search history.

(56) References Cited

U.S. PATENT DOCUMENTS 1,849,864 A * 3/1932 Caspar ..................... A61G 1/01 224/159
3,234,568 A 2/1966 Fischer
4,211,218 A 7/1980 Kendrick
4,347,914 A 9/1982 Gary
4,748,701 A * 6/1988 Marlowe .............. A61G 7/1061 5/89.1
4,944,057 A * 7/1990 Shaw .................. A61G 7/1023 224/159
5,396,670 A 3/1995 Firebaugh et al.
(Continued)

FOREIGN PATENT DOCUMENTS

CN 102727355 A 10/2012
EP 0730855 A2 9/1996
(Continued)

*Primary Examiner* — David R Hare
(74) *Attorney, Agent, or Firm* — The Webb Law Firm

(57) ABSTRACT

A patient sling is formed of plastics sheet or moulded plastics or textile material having a back support portion and a patient seat support portion. Two straps are coupled to respective side flanges of the back rest support, while two straps are coupled to respective side flanges the seat support portion and connect to the straps. The straps can be adjusted in length and also detached from the upper straps in order to adjust the configuration of the seat portion. The seat support portion includes a cut out for assisting a patient in effecting bodily functions and fold lines can also enable the seat support portion to be either partially folded or fully folded back in order to assist a patient in dressing and undressing, while continuing to be retained and supported by the back rest support portion.

19 Claims, 6 Drawing Sheets

(56) References Cited

U.S. PATENT DOCUMENTS

| | | | | | |
|---|---|---|---|---|---|
| 5,515,549 | A * | 5/1996 | Wang | A61G 1/01 | 297/183.6 |
| 5,530,975 | A * | 7/1996 | Firebaugh | A61G 7/1051 | 5/89.1 |
| 5,615,426 | A * | 4/1997 | Hokett | A61G 7/1017 | 5/89.1 |
| 5,729,843 | A | 3/1998 | Manthey | | |
| 5,809,591 | A | 9/1998 | Capaldi et al. | | |
| 6,079,062 | A | 6/2000 | Mullin | | |
| 6,289,534 | B1 | 9/2001 | Hakamiun et al. | | |
| 6,637,610 | B1 | 10/2003 | Cheeseboro | | |
| 6,883,190 | B2 | 4/2005 | Carbonneau et al. | | |
| 6,938,285 | B2 | 9/2005 | Fernie et al. | | |
| 7,780,587 | B2 * | 8/2010 | Thornton | A61H 3/04 | 119/770 |
| 9,801,768 | B2 * | 10/2017 | Wong | A61G 7/1038 | |
| 10,517,785 | B2 | 12/2019 | Petterson et al. | | |
| 10,555,857 | B2 * | 2/2020 | Anderberg | A61F 5/3776 | |
| 2006/0080775 | A1 | 4/2006 | McWattie et al. | | |
| 2006/0137097 | A1 | 6/2006 | Frost | | |
| 2008/0189853 | A1 | 8/2008 | Felling | | |
| 2009/0113623 | A1 * | 5/2009 | Thomas | A61G 7/1051 | 5/81.1 R |
| 2012/0240332 | A1 | 9/2012 | Palay et al. | | |
| 2013/0270881 | A1 | 10/2013 | Fowler et al. | | |
| 2017/0181910 | A1 * | 6/2017 | Petterson | A61G 7/1051 | |

FOREIGN PATENT DOCUMENTS

| | | | | |
|---|---|---|---|---|
| EP | 1031339 | A2 | 8/2000 | |
| EP | 2055284 | A1 | 6/2009 | |
| GB | 2466304 | A | 6/2010 | |
| GB | 2531276 | A * | 4/2016 | A61G 7/1051 |
| GP | 2531276 | A | 4/2016 | |
| JP | H09103450 | A | 4/1997 | |
| JP | 2000189463 | A | 7/2000 | |
| JP | 2005205069 | A | 8/2005 | |
| JP | 3144879 | U | 8/2008 | |
| JP | 2010501216 | A | 1/2010 | |
| JP | 2011217882 | A | 11/2011 | |
| JP | 2014506815 | A | 3/2014 | |
| JP | 2015512289 | A | 4/2015 | |
| WO | 2008025203 | A1 | 6/2008 | |
| WO | 2012073209 | A1 | 6/2012 | |
| WO | 2013144542 | A1 | 10/2013 | |
| WO | WO-2018002804 | A1 * | 1/2018 | A61G 1/01 |

* cited by examiner

CONFIGURABLE PATIENT SLING

CROSS-REFERENCE TO RELATED APPLICATIONS

This application is a continuation of U.S. patent application Ser. No. 15/740,427, which is the United States national phase of International Application No. PCT/EP2016/065221 filed Jun. 29, 2016, and claims priority to European Patent Application No. 15174444.8 filed Jun. 30, 2015, the disclosures of which are hereby incorporated in their entirety by reference.

BACKGROUND OF THE INVENTION

Field of the Invention

The present invention relates to a configurable patient sling, such as may be used with a patient standing aid or raising aid, which are particular kinds of active lifts or hoists, in order to assist moving of a patient from sitting to standing, and vice versa, and to other positions in between.

Description of Related Art

Patient slings are in widespread use in hospitals and care home environments. Some slings are designed to support the entire weight of a patient, for example when in a reclining position, and are used with passive lifts or hoists while others allow the patient to be supported in a sitting or even a standing position by an active lift or hoist, such as a standing and raising aid.

Typically, the slings are in the form of a shaped sheet of material having a plurality of straps which are, when in use, attached to a lifting mechanism or hoist able to lift the patient entirely off the ground (i.e., a passive lifting mechanism or hoist) or a support surface, and/or to provide stabilization support to a patient who has some mobility or is able to sit or stand with assistance using an active lifting mechanism or hoist that requires the patient to bear some weight with his or her leg(s).

While known slings on the whole provide good patient support, they can restrict the mobility of the patient or fail to provide adequate support when the patient seeks to perform any of a variety of tasks, such as dressing, cleaning, toileting and the like.

SUMMARY OF THE DISCLOSURE

The present invention seeks to provide an improved patient support sling.

According to an aspect of the present disclosure, there is provided a patient support sling including a back support portion, a seat support portion connected to the back support portion, first and second back support straps connected to the back support portion, third and fourth straps connected to the seat support portion, wherein the third and fourth straps are adjustably connected to the first and second straps, and the seat support portion is foldable relative to the back support portion.

Preferably, the third and fourth straps are length adjustable. The third and fourth straps may be separable from the first and second straps.

Advantageously, the seat support portion is foldable relative to the back support portion at a plurality of fold lines. The seat support portion is preferably foldable at least along lateral fold lines. In a preferred embodiment, the seat support portion is foldable along a transverse fold line allowing upward folding of the seat support portion relative to the back support portion. In a preferred embodiment, the seat support portion can be folded up completely towards the lower back of the patient or detached, or can be folded at one or the other of the sides of the seat support portion.

The fold lines may be weakening lines in the material of the back and seat support portions, or flexible connecting elements between the support portions, or the like.

In a preferred embodiment, the back and seat support portions are formed from a common sheet of material, and in other embodiments they may be formed of separate sheets of material coupled together.

The back support portion and/or seat support portion may be formed of a material that holds its shape. The material may be of a plastics sheet or moulded plastics or textile material.

Other features and advantages will become apparent from the description and drawings which follow.

BRIEF DESCRIPTION OF THE DRAWINGS

Embodiments of the present disclosure are described below, by way of example only, with reference to the accompanying drawings, in which.

DESCRIPTION OF THE INVENTION

Figure 1:
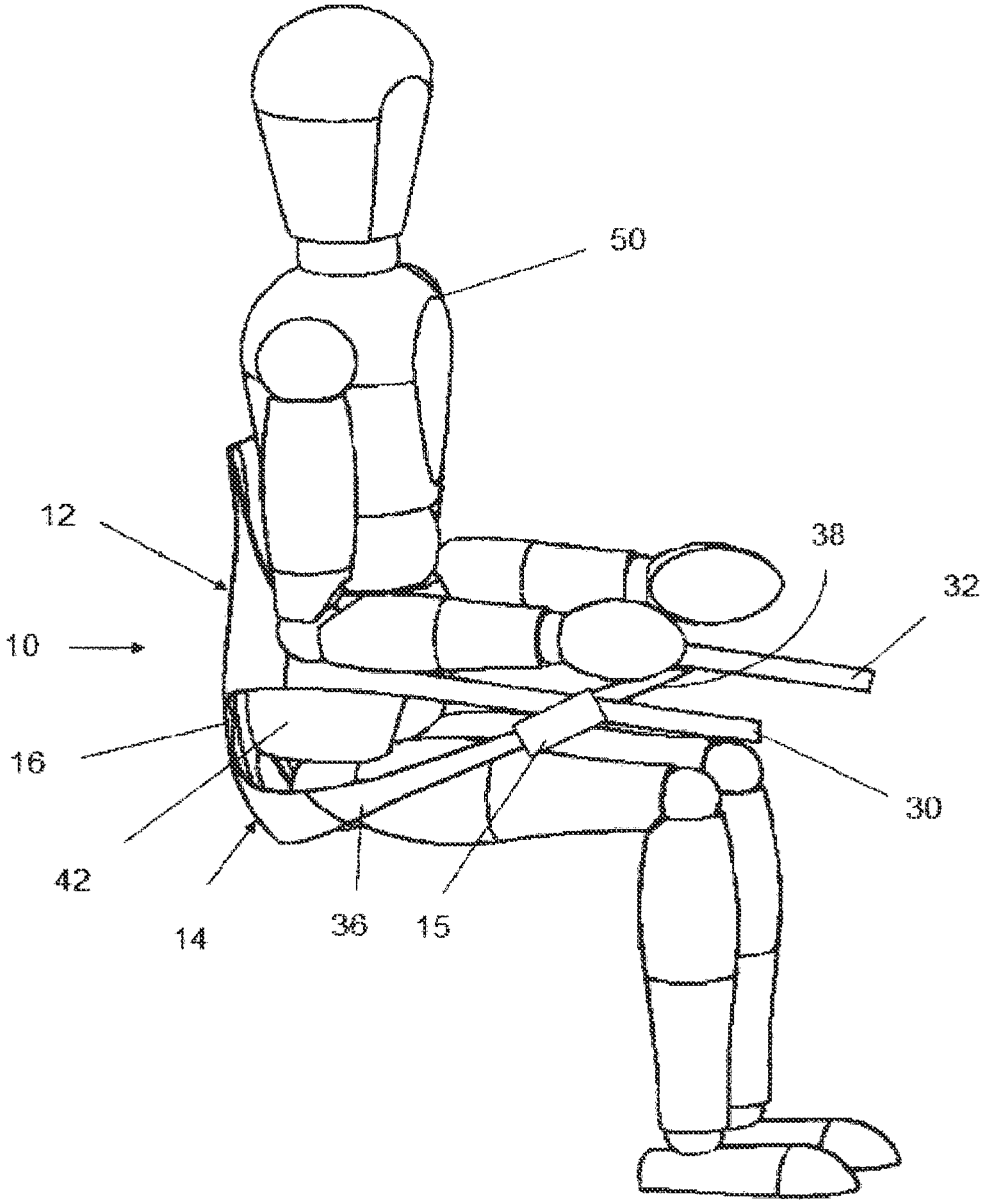
FIG. 1 is a side perspective view to one side of an embodiment of sling supporting a patient in a seated position.

The Figures show in schematic form an embodiment of a patient support sling designed to support a patient in sitting position as well as when standing. The sling can also lift a patient off the ground if need be, although its typical use is with a standing and raising aid, such as are employed to assist patients who have some use of their legs.

Referring to FIGS. 1 to 4, the sling 10 includes a back support portion 12 and a seat support portion 14, which are formed in this embodiment from a single sheet of material 16. The material 16 forming the back and seat support portions 12, 14 can be of any suitable material including, for example, a generally flexible or stiff plastics material such as acrylonitrile-butadiene-styrene (ABS), polypropylene (PP), polyoxymethylene (POM) or a soft material such as Silicone, polyurethane (PUR) or thermoplastic elastomer (TPE). The sheet of material 16 may be of uniform thickness throughout the back and seat support portions 12, 14, but in other embodiments the sheet material may have different thicknesses. For example, around the centre portion 26 of the sling 10, the material may be thicker and more rigid than that of the side flanges 18, 20, 22, and 24 of the back support and seat support portions 12 and 14. In other embodiments, the material of the sling may be made rigid at the side flanges 18 and 20 as well as at the centre portion 26. In accordance with some embodiments of this disclosure, the material is construed as rigid when it holds its shape against at least gravity. In other embodiments, the central portion 26 may be of thinner material than the side flanges 18-24. The person skilled in the art will appreciate that having portions of different thicknesses will vary the flexibility of the sheet material 16 and as a result the ability of the sling 10 to conform to the shape of a patient 50 when supported in the sling.

In an embodiment of this disclosure, the back support portion 12 is configured to have an S-shaped curve that is similar to that of a human lumbar spine. In other embodiments of this disclosure, the back support portion 12 is configured without a pre-formed curve and has sufficient flexibility to conform to the curve of the patient's back. In either of these embodiments of the back support portion 12, the back support portion 12 may be dimensioned to span from the ischium region (e.g., ischial tuberosity) of an average-sized adult male patient (or averaged-sized adult female patient) to the lower thoracic spine of such an average-sized adult male patient (or average-sized adult female patient).

The sides 18, 20 of the body portion 12 extend to straps 30, 32 which extend, in this embodiment, substantially horizontally when the back portion 12 is in a substantially vertical orientation. These straps are preferably made of a conformable material and may, for instance, of a webbing of polymer material such as nylon, polyester soft PP or PUR, TPE. At the extremities 34 of the straps 30, 32 there are typically provided connecting elements for attaching the straps to a lifting hoist, of conventional form. Suitable connecting elements are well known in the art and therefore not described in detail herein. One non-limiting example of a lifting hoist configured as a standing and raising aid, to which sling 10 may couple with for lifting a patient between standing and sitting positions, and vice versa, is a Sara® standing and raising aid manufactured by Arjohuntleigh, Inc., such as a Sara® 3000 standing and raising aid or a Sara® Lite standing and raising aid, etc Additional straps 36, 38 extend from the side flanges 22, 24 of the seat portion 14 and these can equally be made of flexible material, such as nylon, polyester soft PP or PUR, TPE webbing. As will be apparent from FIGS. 1 to 4, the straps 36, 38 extend to the back support straps 30, 32, respectively, and in a preferred embodiment are adjustably connected to the straps 30, 32, for instance, by suitable buckles or other fasteners 15, shown schematically in FIGS. 1 to 3 and present in all embodiments, which enable the straps 36, 38 to be pulled closer towards their respective strap 30, 32 or further away, for purposes described below. The buckles or other fasteners 15 allow the operative lengths of the straps 36, 38 to be changed and then fixed, for instance by a friction or tooth gripping mechanism or by means of a traditional adjustable buckle or a pin and spaced eyelets on the straps 36, 38.

One purpose of the straps 36, 38 adjustably connected to straps 30, 32 is that while the straps 30, 32 are the primary load bearing straps, the secondary straps 36, 38 pull up a gluteal portion of the side flanges 22, 24, which are dimensioned and configured to cup the gluteus maximus of a patient wearing the sling 10. Thus, the side flanges 22, 24 may be referred to as gluteal side flanges. The ability of the gluteal side flanges 22, 24 to cup the gluteus maxim us on each side of the patient facilitates proper placement of the sling 10 and ensures that the sling does not slip up the patient's back when in use. Furthermore, this configuration of the side flanges 22, 24, when properly adjusted and connected to the straps 30, 32 via the straps 36, 38, facilitates movement of a patient's hips so they follow the sling 10 in movement up and forward to a standing position from a sitting position because the sling 10 gives support under the patient's rear (i.e., bottom or buttocks) during such sling-assisted movement from sitting to standing when using a patient standing or raising aid.

Figure 2:
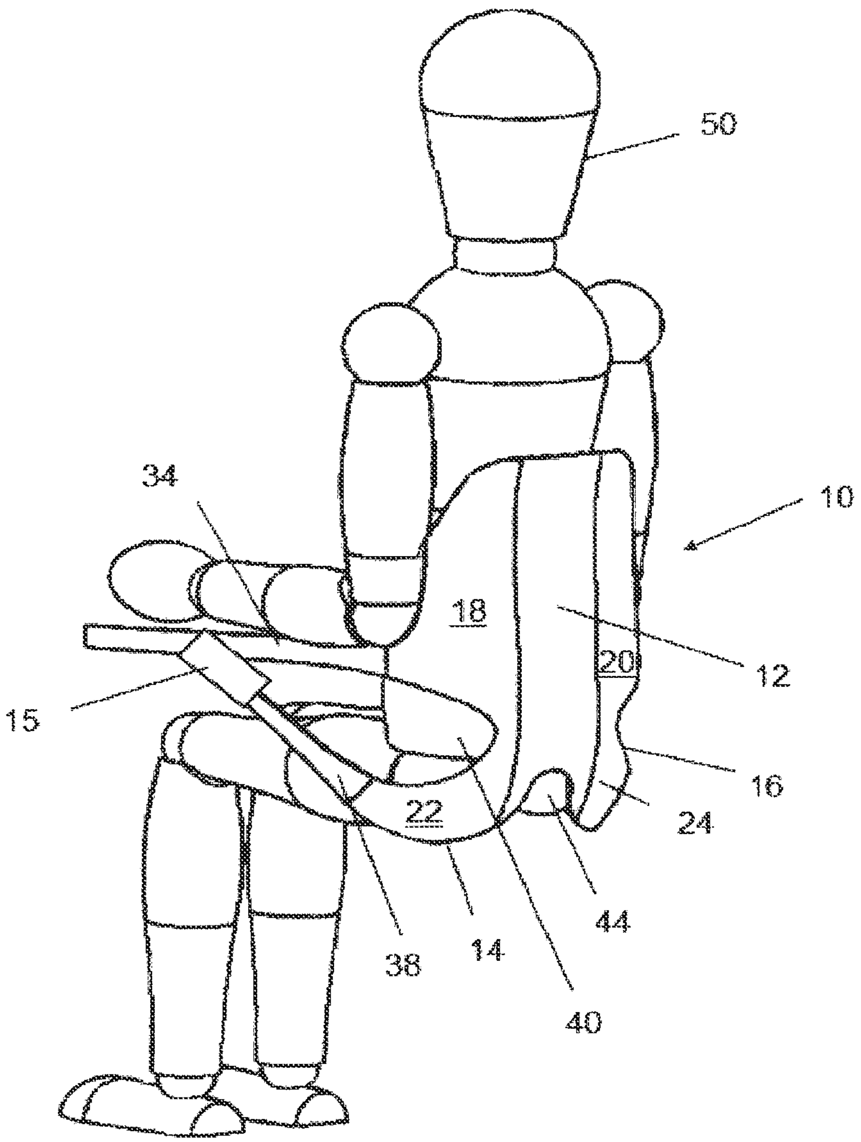
FIG. 2 is a rear perspective view of the sling and patient shown in FIG. 1.

As can be seen in particular in FIGS. 1 and 2, the back support portion 12 and the seat support portion 14 have their respective side flanges 18-24 vertically spaced from one another by means of the lateral cut outs or recesses 40, 42. Not only does this enable the straps 36, 38 to be vertically spaced relative to the straps 30, 32, such that the straps 36, 38 extend at an angle to intersect the straps 30, 32, but it also enables the seat portion 14 to be pulled inwardly and upwardly relative to the back rest portion 12, in order in practice to curve round a patient's seat or bottom (i.e., gluteus maxim us), so as to support the patient and prevent slipping as described above. The seat support portion 14 can, therefore, be placed underneath a patient's bottom or seat and, if desired, at a sufficient angle to be able to support the patient's full weight in a seating position because the seat portion 14 has a curvature to it, or is flexible enough to curve around the patient's buttocks by the pull of the secondary straps 36, 38 on the gluteal side flanges 22, 24, respectively.

The seat support portion 14 also includes a central cut out 44 in its lower surface, which enables a patient to continue to be supported in the sling 10 even when on the toilet, for example. In other words, the central cut out 44 is dimensioned so that it does not press against the tailbone of the patient, thereby decreasing the risks of causing decubitus ulcer over the tailbone, and so that it provides a path of egress for stool and/or urine so that a patient may defecate and/or urinate while wearing the sling 10. Thus, this central cut out 44 provides sling 10 with a functionality lacking in conventional slings, namely, sling 10 may be used to provide assistance with lowering and raising a patient between a standing position to a sitting position on a toilet using an appropriate active hoist or lift, and without the need to remove the sling 10 before the patient defecates and/or urinates in order to avoid substantial soiling of the sling 10.

Figure 5:
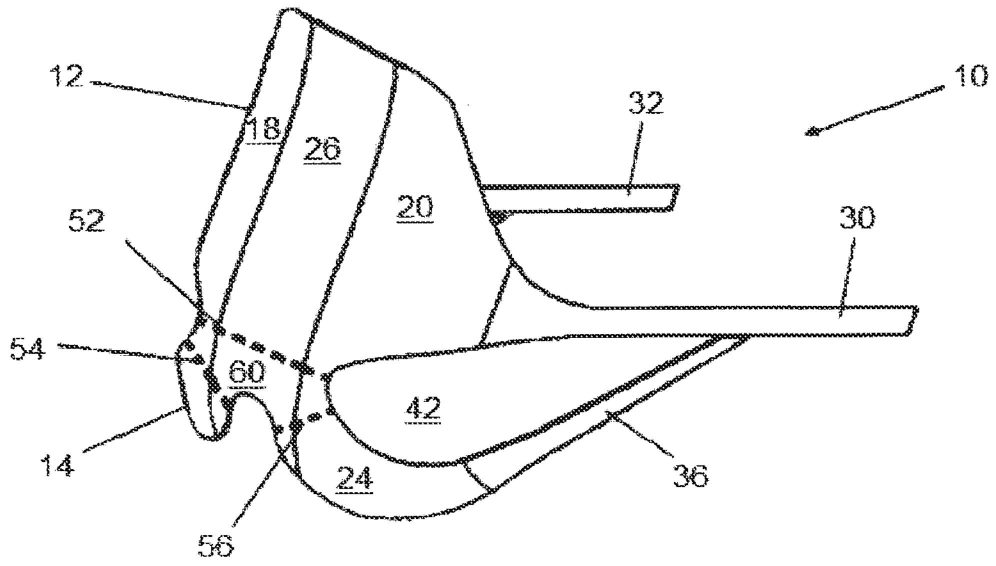
FIG. 5 is a side perspective view of the sling of FIG. 3 showing fold lines between the back and rear support portions of the sling.
Figure 6:
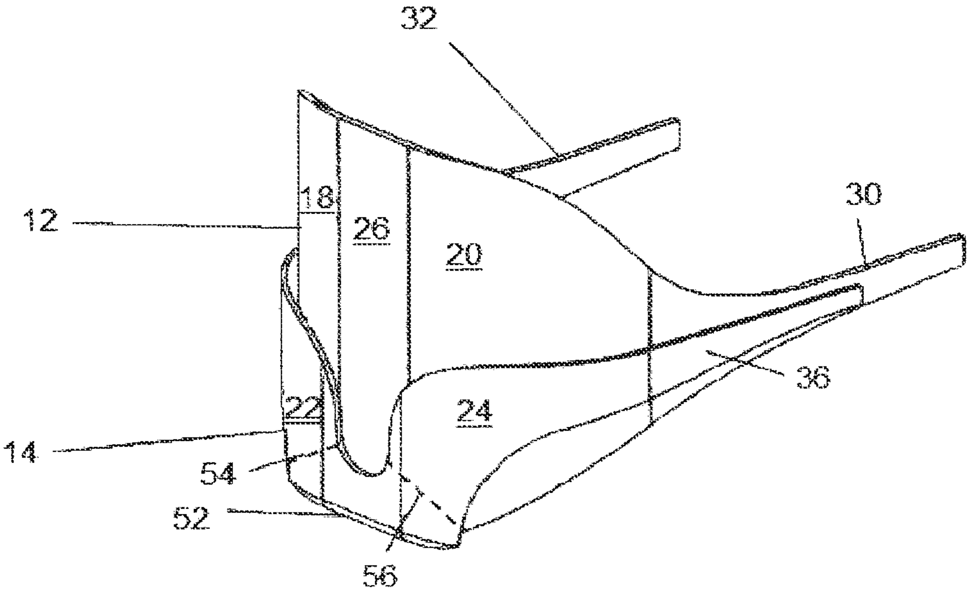
FIG. 6 is a side perspective view of a sling as taught herein in a folded condition along a transverse fold line.

Referring now to FIG. 5, this shows in further detail the structure at the junction between the back rest support 12 and the seat support 14. More specifically, there are provided in this embodiment, three fold lines 52, 54 and 56 in the sheet material 16 forming the back support 12 and the seat support 14. The fold line 52 extends in this embodiment substantially horizontally and between the two lateral recesses 40, 42, so it may be characterized as a transverse fold line. In an embodiment of this disclosure, fold line 52 extends from the apex of one recess 40 to the apex of the other recess 42 so as to traverse the narrowest distance between the recesses 40, 42. This fold line 52 enables the seat support portion 14 to be folded upwardly relative to the back support portion 12, as shown in FIG. 6, which facilitates dressing and/or cleaning a patient who wears the sling because the body below the waist may be free of the sling 10 in this folded up position.

The fold lines 54, 56 are located in the respective sides of the seat support portion 14 and extend at an angle to the horizontal, for example of 30° or so. In an embodiment, the fold lines 52, 54 and 56 are configured in a triangular manner, such that each fold represents a segment disposed on an infinite line that extends to intersect the other two fold lines in a space external to the sling 10. For instance, fold line 52 constitutes a segment of an infinite horizontal line that extends to the right lateral recess 42 to intersect with an imaginary line collinear with right fold 56. The infinite horizontal line that is collinear with fold line 52 intersects the imaginary line collinear with left fold line 54 at a location within the left lateral recess 42. The imaginary lines collinear with fold lines 54 and 56 intersect within the central cut out 44. Thus, in accordance with an embodiment of this disclosure, the geometrical configuration of the arrangement of the fold lines 52, 54 and 56 is that of an imaginary triangle on which each one of the fold lines is disposed on one of the sides of the imaginary triangle in a non-intersecting manner relative to the other two fold lines. In an embodiment of this disclosure, the triangular configuration of the fold lines 52, 54, and 56 is in the form of an isosceles triangle so their imaginary collinear lines intersect although the fold lines 52, 54 and 56 themselves do not intersect. In another embodiment, the fold lines 52, 54 and 56 are offset in a manner that does not allow these imaginary lines to intersect to form a triangle.

Figure 8:
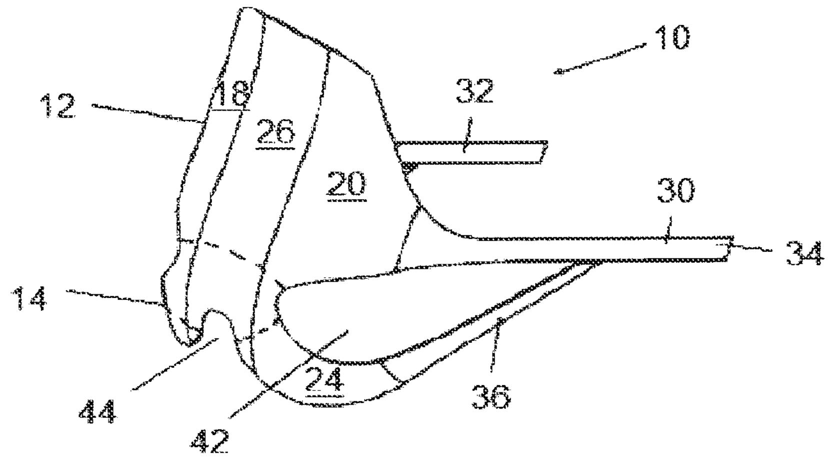
FIG. 8 is a side perspective view of the sling of this disclosure showing fold lines between the back and rear support portions of the sling in accordance with another fold line configuration.
Figure 9:
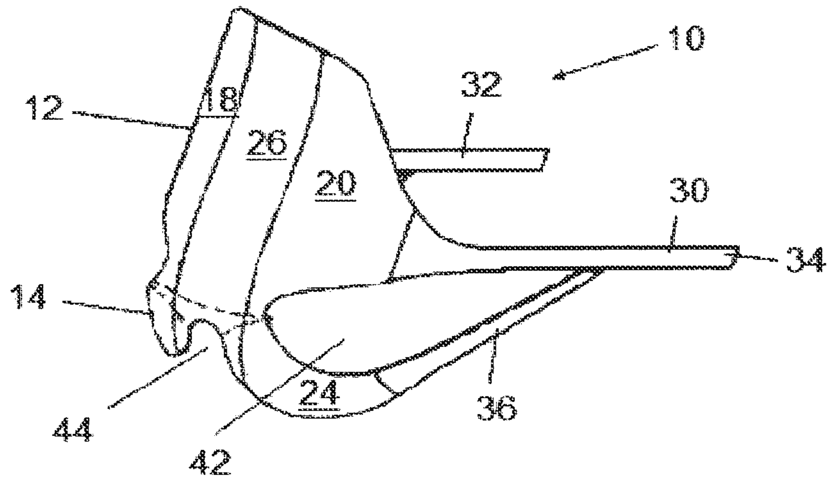
FIG. 9 is a side perspective view of the sling of this disclosure showing fold lines between the back and rear support portions of the sling in accordance with another fold line configuration.

While FIG. 5 illustrates fold lines 52, 54 and 56 as linear lines, these folds lines may be curved so as to be arranged along the sides of a Reuleaux triangle or an isosceles triangle with one, two or three convex sides, such as shown in FIG. 8, or these fold lines may be curved so as to be arranged along the sides of an anti-Euclidean, negatively curved triangle, or an isosceles triangle with one, two or three concave sides, such as shown in FIG. 9.

The fold lines 54, 56 enable the two sides of the seat support portion 14 to be lifted individually of one another, typically by altering the length of their respective straps 36, 38 or by releasing their respective straps completely from their associated strap 30, 32. As explained below, this can assist in dressing or undressing a patient while continuing to support the patient in an upright position via the load bearing straps 30, 32. It is to be understood that in some embodiments of this disclosure, fold lines 52, 54, 56 can be omitted entirely or only one or more of the fold lines 52, 54, 56 may be provided. For example, in one embodiment of this disclosure, only fold line 52 is provided. In another embodiment of this disclosure, only fold lines 54 and 56 are provided.

The fold lines 52, 54, 56 can be provided as weakness lines within the material of the sheet 16 forming the back of seat rest portions 12, 14. Such weakness lines may be formed by making the material of sheet 16 thinner along the fold lines, or by providing perforations in the sheet material 16 along this fold lines, or by providing some other anomaly along the line that permits it to preferentially flex. In one embodiment of this disclosure, the fold lines 52, 54, 56 constitute creases formed in the material that are substantial enough to cause a permanent weakness in the material of sheet 16. In other embodiments, the fold lines 52, 54, 56 could be separate hinge elements fixed to the support portions 12, 14, and may for this purpose be fabric or plastic hinges. In this latter embodiment, the back support portion 12 and the seat support portion 14 may be separate elements of sheet material coupled together by the hinges of the fold lines 52-56.

The fold lines 52, 54, 56 enable the seat rest portion 14 to be folded upwardly and out of the way of the patient's bottom. This can be achieved, in one example, by folding the section 60, shown in FIG. 5, rearwardly and upwardly about fold line 52 until section 60 comes into abutment or closely into abutment with the rear surface of the back rest portion 12. The side flanges 22, 24 of the seat rest portion 14 can be folded the other way by means of the lateral fold lines 54, 56, so as to retain substantially the same orientation as shown in FIG. 5. This arrangement can be seen in FIG. 6, wherein the right gluteal side flange 24 has been folded up about lateral fold line 56 and the left gluteal side flange 22 remains in an unfolded state. Of course, it is possible to fold up the left gluteal flange 22 about the lateral fold line 54 while the right gluteal side flange 24 remains in an unfolded state, and it is possible to fold up both the right gluteal flange 24 and the left gluteal flange 22 about the lateral fold lines 56 and 54 respectively. In these embodiments, the section 60 remains in the unfolded state as it is not folded about the transverse fold line 52.

As will be apparent from FIG. 6, when so folded in this manner, the patient's lower half (e.g., body portion below the waist) is free of the sling 10, enabling the patient 50 to dress or undress his or her lower half while still being supported in the upper portion (i.e., back support portion 12) of the sling 10. This upper portion constitutes upper side flanges 18 and 20, and that portion of the central portion 26 which is above the transverse fold 52, and the associated straps 30, 32. The lower portion (i.e., seat support portion 14) of the sling 10 constitutes the gluteal side flanges 22, 24, and that portion of the central portion 26 which is below the transverse fold 52, section 60, and the associated straps 34, 36.

Figure 7:
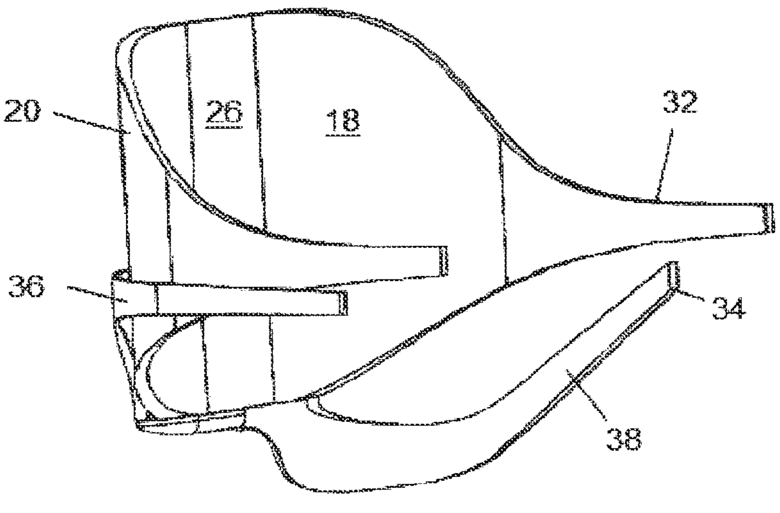
FIG. 7 is a back perspective view of a sling as taught herein in a folded condition with the seat support portion folded up along one side.

The side flaps 22, 24 of the seat support portion 14 can be released independently of one another, if desired. An example is shown in FIG. 7, in which the right hand strap 36 has been raised by folding that portion about the associated fold line 56. In this configuration, the patient remains supported by the left hand side of the sling, namely, by the left hand straps 32 and 34 while access is provided to the patient's right hand side, for instance for dressing or the like.

The side flaps 22, 24 can be lowered again to provide full support to the patient when they are placed in position against the patient's gluteus maximus and adjusted in place using the straps 34 and 36, which are fastened to straps 32 and 30, respectively, via fasteners 15, such as buckles.

In summary, a preferred embodiment has a main body 12, 14 formed in what could be described as a shape of an X, where the straps 30, 32 are the upper parts of the X. These upper straps 30, 32 are attached to a lifting hoist, while the lower straps 36, 38 of the X are attached to the upper straps 30, 32 via adjustable plastic clips or buckles 15 that can be pulled until the desired configuration of the bottom part 14 of the sling 10 is reached. The sling 10 has a backrest 12 placed in the middle of the X and upwards. This makes sure a patient's back has sufficient support during the whole transfer.

The embodiments of sling disclosed herein function as an active sling normally used on patient standing and raising aids. The difference with the embodiments of sling disclosed herein compared to other forms of sling is their form and function. Since the back 26 and side panels 22, 24 of the back support portion 12 of the sling are attached to a main attachment point of a hoist by means of the straps 30, 32 and their terminal couplings 34, this part of the sling 10 can work on its own. However, the sling 10 can be fully employed with the seat support section 14 attached to the back support portion 12 so that the seat support section 14 goes underneath the buttocks of a patient 50, when attached to the upper straps 30, 32 by the straps 36, 38. In accordance with an embodiment of this disclosure, the sling 10 is configured to provide two point load bearing support to the patient that requires the patient to provide a third stabilizing load bearing support via one or more legs, which may be standing on a support surface such as the floor or a standing platform of a standing and raising aid (i.e., an active lifting mechanism).

The shape of the sling 10 offers a multifunctional arrangement with a more comfortable standing and raising movement, as well as a safer one as the sling 10 can allow support under the patient's rear (i.e., gluteus maxim us). Furthermore, the sling 10 is configurable so that at least on one side at a time (right side versus left side) the sling provides load bearing support during removal of the of the patient's clothing, and the sling 10 may also be configurable so that its lower portion is foldable out load bearing engagement with the patient while the upper portion maintains load bearing engagement with the patient in order to facilitate cleaning and/or dressing of the patient's lower body below the waist.

The sling 10 has a shaped bottom part 14 that fits under the rear of the patient 50, so as to cup or grasp the gluteus maximus, and is attached to the top attachment straps 30, 32 of the sling 10 by lower straps 36, 38 with adjustable buckles 15 or other fasteners. The fold lines 52, 54 and 56 may fold to some degree toward the patient when pull by the straps 36, 38 force the portion 60 and gluteal side portions 22, 24 to flex about the fold lines to conform about the patient's gluteus maxim us and buttocks. The lower strap attachments can then either be loosened or detached. In this mode, with the straps 36, 38 loosed or detached, the bottom seat support portion 14 of the sling 10 can be folded up to allow access and easy removal of the pants of the patient. The seat support portion 14 can either be loosened/detached on one side of the sling 10 and then folded up on one side of the patient 50 at a time as shown in FIG. 7, or loosened/detached on both sides and completely folded up along the lower back of the patient 50 as shown in FIG. 6.

The main parts 12, 14 of the sling 10 can be made from plastic sheet or moulded plastics. On this part everything from straps to softer padding material for patient comfort can be attached.

In another embodiment the sling can be made of fabric material, advantageously with plastic inserts in the fabric, as well as the other features mentioned.

The shape of the sling 10 and the ability it has to fold in three places allows the sling 10 to be used from either side of the patient or behind the patient as well. In an embodiment of this disclosure, the lower seat support portion 14 of the sling 10 can be attached to the back support portion 12 either with plastic clips or adjustable bands and can be detachable and/or adjustable.

Figure 3:
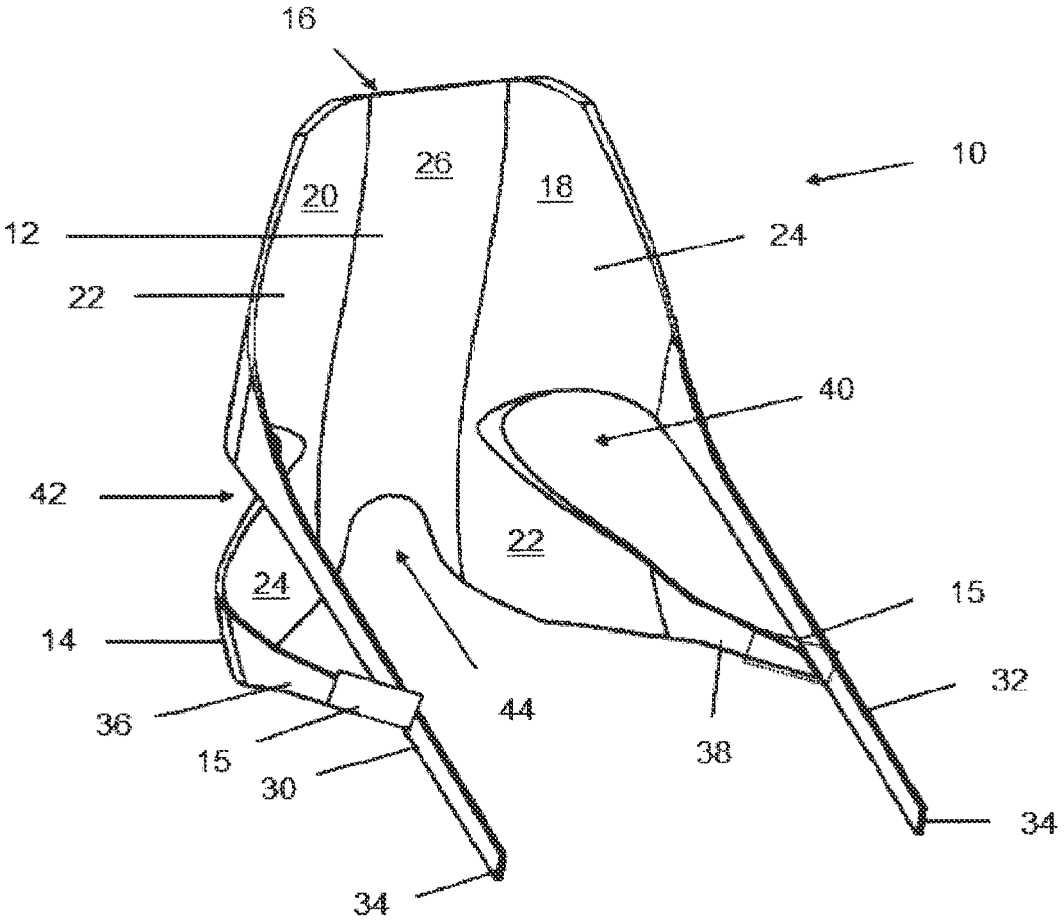
FIG. 3 is a front perspective view of the sling of FIG. 1 with no patient in the sling.
Figure 4:
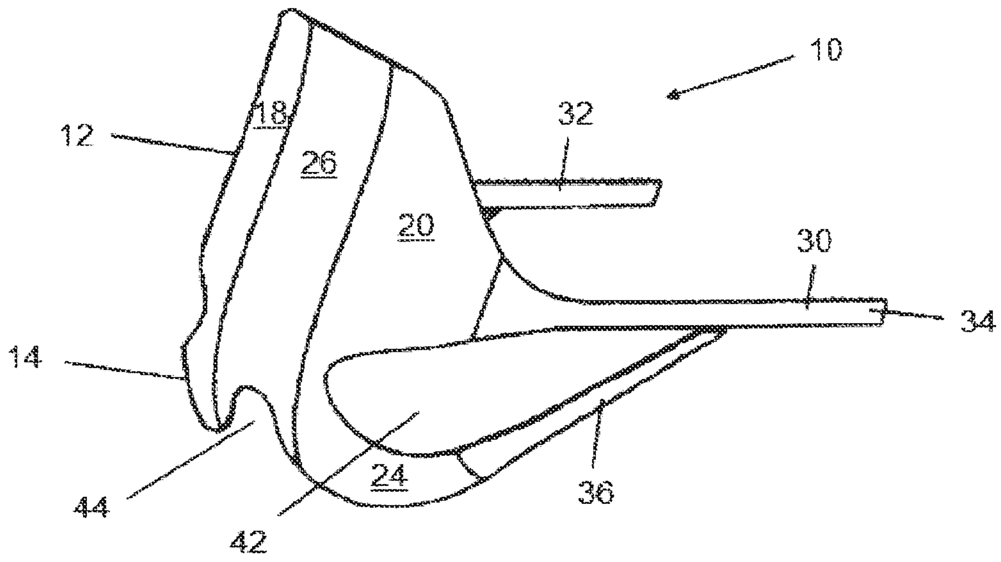
FIG. 4 is a side perspective view of the sling of FIG. 3.

When the patient 50 is standing up and the sling 10 has been folded up, as in the configuration of FIG. 6, and the patient's pants pulled down, then the sling 10 can be attached again as in the configuration of FIG. 3, and the patient 50 can be lowered over the toilet. The opening or gap 44 in the lowest part 14 of the sling 10 allows the patient 50 to have the sling on even when using the toilet because the opening provided by the central cut out 44 provides a path clear of material for stool or urine to fall into the toilet without interference. When seated with the sling 10, the opening 44 will be placed directly over the toilet. Thus, the sling 10 does not need to be removed when the patient 50 is on the toilet.

The sling 10 can also allow support under the rear or bottom of the patient 50 at least on one side at a time during the removal of the patient's clothing. The sling 10 allows for good access to clothing and for washing the patient 50 because of the adjustable gluteal side flaps 22, 24 on the sides of the seat portion 14 of the sling 10.

The sling 10 allows support both in the back and at the rear (i.e., gluteus maxim us and buttocks) of the patient 50 and creates a much more comfortable transfer and standing position. In accordance with an embodiment of this disclosure, sling 10 is configured for only partial weight bearing and is suitable for use with a standing and raising aid, and not with a passive hoist or lift that completely carries a patient's full body weight. In other words, in accordance with certain embodiments of this disclosure, the sling 10 is configured as a partial weight bearing sling that is used with patients who can bear a substantial amount of weight with their legs (i.e., enough weight to stand with support) and, therefore, can be assisted between sitting and standing positions using an active lift attached to the sling 10.

Where the sling is made of plastic sheet or moulded plastic or textile material it is also very easy to clean compared to standard fabric slings and can be cleaned immediately on-site by staff directly after use.

Advantageously, the sling 10 is made of a plastic sheet or moulded plastic which is rigid enough to make it easier to place it under the rear (i.e., gluteus maxim us and buttocks) of a sitting patient.

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

The disclosure in the abstract accompanying this application is incorporated herein by reference.

The invention claimed is:

1. A patient support sling comprising:

a back support portion;

a seat support portion comprising side flanges and being connected to the back support portion;

first and second back support straps connected to the back support portion; and third and fourth straps extending from the side flanges of the seat support portion, wherein the third and fourth straps are connectable to the first and second straps, wherein the seat support portion is foldable relative to the back support portion about at least one fold line, wherein the seat support portion is configured to fold rearwardly and upwardly about the at least one fold line to closely abut a rear surface of the back support portion, wherein the at least one fold line is provided as at least one of:

at least one weakness line within the material of a sheet forming the back support portion or the seat portion; and at least one hinge element fixed to the back support portion or the seat support portion; and wherein the seat support portion further comprises a central cut out in its lower surface.

2. The patient support sling according to claim 1, wherein the third and fourth straps are length adjustable.

3. The patient support sling according to claim 1, wherein the third and fourth straps are separable from the first and second straps.

4. The patient support sling according to claim 1, wherein the seat support portion is foldable relative to the back support portion at a plurality of fold lines.

5. The patient support sling according to claim 4, wherein the seat support portion is foldable at least along lateral fold lines.

6. The patient support sling according to claim 1, wherein the seat support portion is foldable along a transverse fold line allowing upward folding of the seat support portion relative to the back support portion.

7. The patient support sling according to claim 1, wherein the at least one fold line comprises flexible connecting elements between the back and seat support portions.

8. The patient support sling according to claim 1, wherein at least one of the back support portion and the seat support portion are formed of a material, which holds its shape.

9. The patient support sling according to claim 8, wherein the material of at least one of the back support portion and the seat support portion is or includes a plastics sheet material.

10. The patient support sling according to claim 9, wherein at least one of the back support portion and the seat support portion are formed from one of plastic sheet material, molded plastics, and textile material.

11. The patient support sling according to claim 1, wherein the back and seat support portions are formed from a common sheet of material.

12. The patient support sling according to claim 1, wherein the back and seat support portions are formed from separate sheets of material coupled together.

13. The patient support sling according to claim 4, wherein the seat support portion is foldable along at least a transverse fold line allowing upward folding of the seat support portion relative to the back support portion.

14. The patient support sling according to claim 4, wherein the plurality of fold lines are at least one of weakening lines in the material of the back and seat support portions and flexible connecting elements between the back and seat support portions.

15. The patient support sling according to claim 1, wherein the third and fourth straps are wider adjacent the seat support portion and narrower at terminal ends opposite the seat support portion.

16. The patient support sling according to claim 1, wherein the at least one fold line includes the at least one weakness line, and wherein the at least one weakness line is formed from a material thinner than the material of the sheet forming the back support portion or the seat portion.

17. The patient support sling according to claim 1, wherein the at least one fold line includes the at least one weakness line, and wherein the at least one weakness line is formed from perforations in the material of the sheet forming the back support portion or the seat portion.

18. The patient support sling according to claim 1, wherein the at least one fold line includes the at least one weakness line, and wherein the at least one weakness line causes the material to preferentially fold along the fold line.

19. The patient support sling according to claim 1, wherein the at least one fold line includes the at least one weakness line, and wherein the at least one weakness line constitutes a crease causing permanent weakness in the material.

* * * * *